United States Patent Office 2,898,550
Patented Aug. 4, 1959

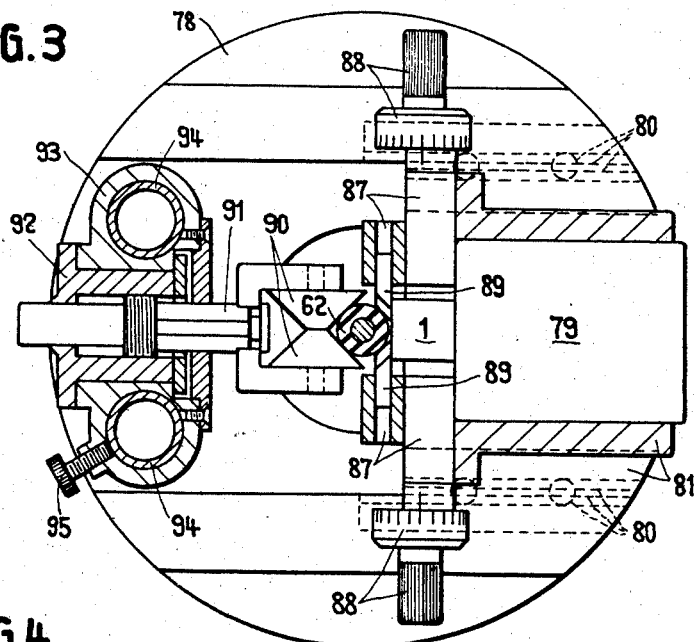
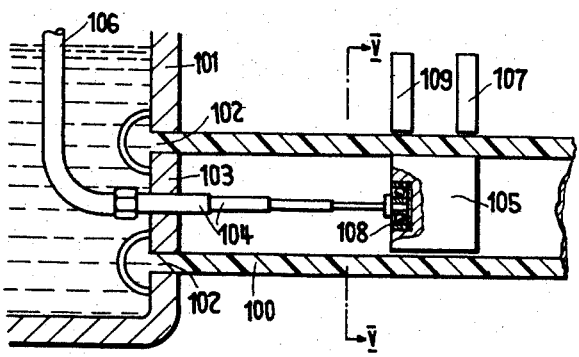
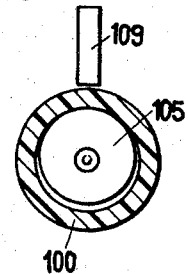
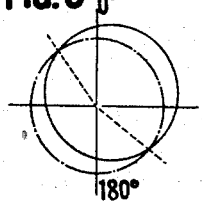
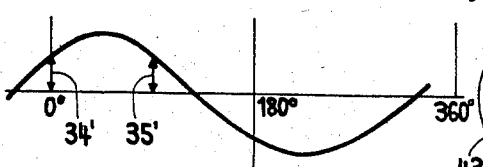
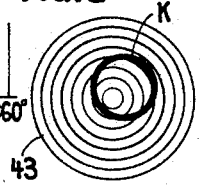

2,898,550

METHOD FOR DETERMINING THE POSITION OF THE CORE OF A BODY CONSISTING OF A CORE AND A MANTLE

Eugen Fischer, Busswil, near Buren an der Aare, Switzerland

Application March 21, 1956, Serial No. 572,971

Claims priority, application Switzerland March 26, 1955

8 Claims. (Cl. 324—61)

This invention relates to a method for determining the position of the core of a body consisting of a core and a mantle covering the core, the core and the mantle being made of materials having different properties.

Determination of positions particularly of eccentricities of this kind are of particular importance in the manufacture of electric cables because the conductor of the cable shall concentrically be imbedded in the cable insulation for well known reasons. Thereby the measurement shall continuously be effected on the cable which has just been provided with its insulation for immediately readjusting the manufacturing apparatus whenever excessive eccentricities are measured. It is evident that such measurement of the eccentricity of the cable conductor is to be determined by an apparatus entirely situated outside the cable. In prior art measuring devices this was done by means of an electric field set up in the cable insulation, whereby the thickness of the insulation was measured at the same time for several places round the cable and the cable eccentricity was determined from the differences in thickness measured at a time. In such known measuring methods the capacity between the cable conductor and four electrodes symmetrically arranged over the cable circumference was measured and from the deviations between the separate capacity values measured the amount and the direction of the conductor eccentricity were determined. This well known method had different disadvantages. It was difficult to maintain the cable conductor which served as the one electrode for each of the capacities at a prescribed potential, for instance earth potential. Inhomogeneities of the cable insulation caused variations of the capacities so that eccentricities were indicated where there was no real cable eccentricity. It also proved to be difficult to pass the cable before the measuring electrodes applied against the cable from different sides and to keep the air gap between electrodes and cable for all the capacities at a constant value. Variations in the width of the air gap also caused appreciable capacity variations so that eccentricities were indicated where there was no real cable eccentricity.

These disadvantages and particularly the last mentioned disadvantage may be avoided when the measuring method of this invention is used, which method is broadly characterized in that the thickness of the mantle is progressively and successively measured for different places distributed over the circumference of the body and in that the position of the core, for instance its eccentricity is determined from the temporary variations of the measured thickness. Thereby it is possible to use one single feeler or the like adapted for measurement by setting up an appropriate field, for instance an electric or electromagnetic field and to rotate this feeler round the cylindrical body to be tested, for instance round the cable, whereby a displacement of the core from the correct position, for instance an eccentricity of the cable conductor is indicated or not according to whether the measuring quantity corresponding to the mantle thickness, for instance the insulation thickness of the cable does or does not change in the course of the measurement.

It is another object of this invention to do away with the other disadvantages of the above mentioned capacitive measurement in that an electromagnetic field is set up in the mantle, the thickness of the mantle being determined from the reaction of the core and/or the mantle onto the electromagnetic field. Thereby inhomogeneities of the cable insulation are without influence on this electromagnetic field and there is no necessity for maintaining the cable conductor at a given electrical potential, that is there is no need for an electric connection to the cable conductor.

With reference to the attached drawing one embodiment of an apparatus for measuring the eccentricity of cable conductors in accordance with this invention will be explained, by way of example, in the following description.

In the drawing—

Fig. 3 is a cross section of the measuring device of the apparatus on the line III—III in Fig. 2.

Fig. 4 is a schematic section of a specific embodiment of the measuring apparatus.

Fig. 5 is a section on the line V—V in Fig. 4.

Figs. 6 and 7 are schematic illustrations aiding a better understanding of the invention and Fig. 8 is a schematic illustration of the indicating device of the apparatus.

Figure 1:
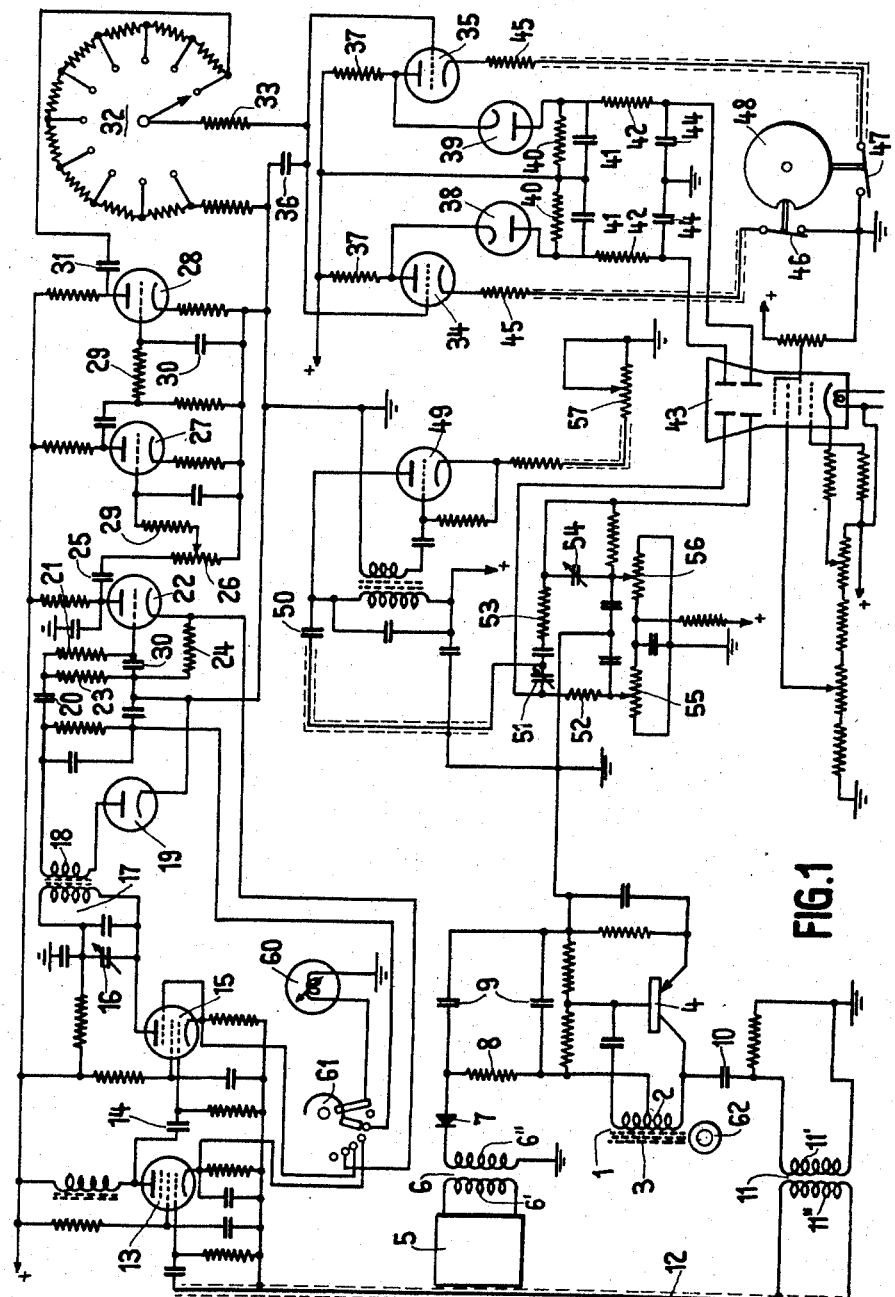
Fig. 1 is a diagram showing the electrical equipment of the apparatus.

Fig. 1 shows a feeler 1 consisting substantially of a high frequency coil 2 and a high frequency core 3. When the coil 2 is operated at very high frequencies the core 3 may be dispensed with. The coil 2 has a tapping, the coil portions being interconnected in a well known manner with a transistor 4 for forming a high frequency oscillator. The transistor 4 is energized from a high frequency oscillator 5 operating for instance at a frequency of about 100 kc., over a transformer 6, a rectifier 7 and a filter chain 8, 9 and the oscillator constituted substantially by the transistor 4 and the coil 2 oscillates at a frequency of about 500 kc. which is substantially determined by the inductivity of the coil 2 and the stray capacities. Another high frequency transformer 11 is connected to the collector of the transistor 4 by means of a condenser 10, the high frequency oscillation from the oscillator 2, 4 being transmitted over this transformer 11 and a cable 12 to a first high frequency amplifying stage having an amplifying tube 13. This amplifying stage is of conventional design and needs no further explanation. Over a coupling condenser 14 the oscillation amplified in tube 13 is applied to the grid of an amplifier and limiter tube 15. The way of operation of limiter tubes such as tube 15 is well known from F.M. receivers the main object of this tube being to apply a constant voltage to the discriminator connected into its anode circuit. As shown in Fig. 1 the discriminator substantially consists of an oscillating circuit 17 tunable by means of the variable capacitor 16, the oscillating circuit being tuned in such a way that the mean frequency of the oscillator 2, 4 falls into the straight portion of the resonance curve of the oscillating circuit 17. A secondary winding 18 is coupled to the inductor of the oscillating circuit 17 and the voltage induced in the winding 18 is demodulated by a diode 19. An A.C. coupling including the condenser 20 and a resistor 21 is provided between the discriminator output and the control grid of another amplifying tube 22. By means of a resistor 23 the mean potential of the control grid of tube 22 is kept at earth potential and the cathode of tube 22 is automatically biased by means of a cathode resistor 24. Potential variations applied to the grid of tube 22 are amplified in the anode circuit of this tube and are transmitted over a coupling condenser 25 and a potentiometer 26 to another amplifying stage comprising a tube 27. There is a third amplifying stage including tube 28, this third amplifying stage being of similar design as the stages comprising tubes 22 and 27. The amplifier including tubes 22, 27 and 28 is designed for very low frequencies and allows sufficient amplification of an input voltage of for instance 1 cycle whereas hum voltages are filtered out by the low-pass sections connected in the grid circuits of tubes 22, 27 and 28, comprising resistors 21 and 29 respectively and condensers 30.

The amplified alternating voltage appearing at the anode of tube 28 is applied over a condenser 31 to a decimal resistance 32 from where the voltage is transmitted over another filter resistor 33 to the control grids of tubes 34 and 35, another filtering condenser 36 being connected to the grids of tubes 34 and 35. The anodes of tubes 34 and 35 are fed over similar load resistors 37, the anodes of tubes 34 and 35 being also connected each to the cathode of a diode 38 and 39 respectively. The anodes of diodes 38 and 39 are interconnected over high ohmic resistors 40 with the voltage source of tubes 34 and 35 and relatively high capacity condensers 41 are connected in parallel to the resistors 40. Over further resistors 42 the anodes of the diodes 38 and 39 are connected each to one horizontal and one vertical deflecting plate of a cathode ray tube 43 and to further filter condensers 44. Suitable values for the filter circuit of the deflecting plates are as follows:

| | | |
|---|---|---|
| Resistors 40 | megohms | 80 |
| Resistors 42 | do | 10 |
| Capacitors 40 | µf | 0.25 |
| Capacitors 44 | µf | 0.5 |

Over resistors 45 and screened cables the cathodes of tubes 34 and 35 are connected each to an earthing switch 46 and 47 respectively, switches 46 and 47 being controlled by a cam as schematically shown in Fig. 1, whereby the switches are closed for a short time one after the other. On the closure of switch 46 or 47 the tube 34 or 35 respectively becomes conducting for a short time whereby a pulse-like voltage drop occurs at the anode of the conducting tube the value of the voltage drop being determined by the grid voltage of the tube.

The deflecting plates of the cathode ray tube 43 which are not interconnected with the diodes 38 and 39 are fed with similar voltages phase shifted by 90° in order to deflect the electron beam in a circular path, whereby a circular luminous ring is produced on the screen of the cathode ray tube 43. This deflecting voltage is produced in a normal oscillator having a vacuum tube 49, the voltage being transmitted from the anode of this tube over a condenser 50 to two phase shift circuits, the one consisting of a variable capacitor 51 and a resistor 52 and the other consisting of a resistor 53 and a variable capacitor 54. The phase shifted voltages produced in these phase shift circuits are superimposed to positive constant voltages which may be adjusted to the desired value by means of potentiometers 55 and 56 respectively. A variable resistor 57 is connected into the cathode circuit of the tube 49 which oscillates at a frequency of for instance 75 kc., the oscillator voltage and consequently the alternating voltage applied to the deflecting plates of the cathode ray tube 43 being adjusted by means of this resistor 57 in order to adjust the size of the luminous ring appearing on the screen of the cathode ray tube to a desired value.

The circuit shown in Fig. 1 comprises a supervising instrument 60 which may be connected to the cathodes of tubes 13, 15 and 22 and to the output of the discriminator 17, 18, 19 by means of a selector switch 61.

Figure 2:
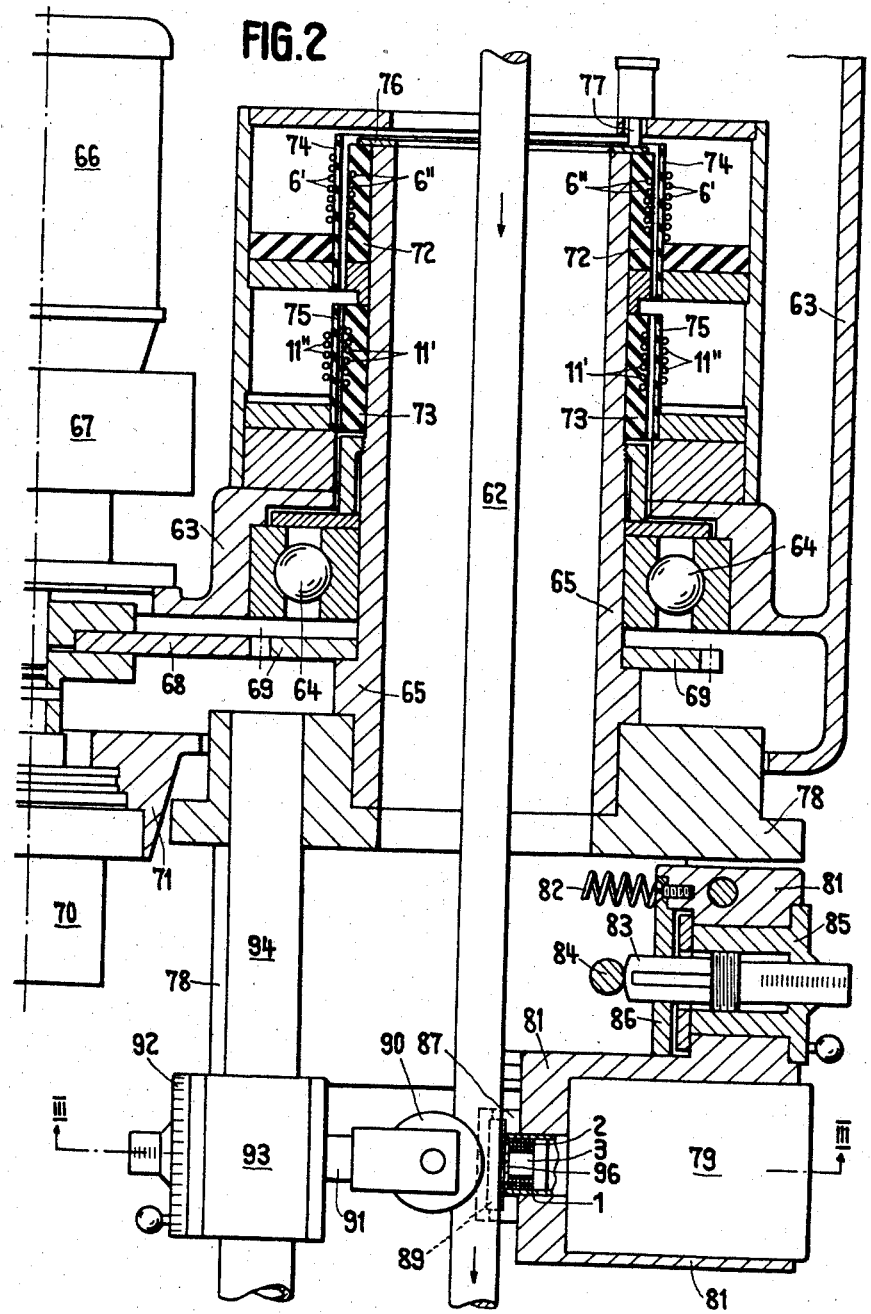
Fig. 2 is an axial section of the measuring device of the apparatus.

Figs. 2 and 3 illustrate the most essential mechanical parts of the measuring apparatus. The cable 62 to be tested runs from the manufacturing apparatus (not shown) through an opening (not shown) of a casing 63 of the measuring apparatus and passes in the direction of the arrow in Fig. 2 through a hollow shaft 65 journalled in the casing 63 by means of a ball bearing 64. The hollow shaft 65 is driven from an electromotor 66 over a reduction gear 67 and toothed wheels 68 and 69 at a low speed of for instance one rotation per second. The transmission ratio of wheels 68 and 69 is 1:1. A cam switch 70 comprising the rotating cam portion 48 schematically shown in Fig. 1 and a stationary part carrying the switches 46 and 47 illustrated in Fig. 1 is coupled with the shaft of the toothed wheel 68. The stationary part of the cam switch 70 with the switches 46 and 47 may be turned by a limited angle in an eye 71 of the casing 63, the amount and the direction of the rotation being indicated on a suitable scale provided on the outer edge of the eye 71. This construction serves for adjusting the phase of the closing moments of the switches 46 and 47 with respect to the rotation of the hollow shaft 65 and the parts rotating with the latter for a purpose later described.

Coil bodies 72 and 73 of isolating material are fixed on the rear portion of the hollow shaft 65, the secondary winding 6″ of the high frequency transformer 6 (Fig. 1) and the primary winding 11′ of the high frequency transformer 11 (Fig. 1) being imbedded in the coil bodies 72 and 73 respectively. Fixed coil bodies 74 and 75 are provided opposite the coil bodies 72 and 73 respectively, the coil bodies 74 and 75 carrying the primary winding 6′ of the high frequency transformer 6 and the secondary winding 11″ of the transformer 11 respectively. A slip ring 76, for instance of brass or copper is fixed on the rear end of the hollow shaft 65 and an earthing brush 77 slides on ring 76 for earthing the hollow shaft 65 and the parts connected to the same.

A measuring head 78 is fixed on the fore end of the hollow shaft 65. The feeler 1 together with the high frequency oscillator including the transistor 4 (Fig. 1) is fixed in a carrier 81 mounted for radial displacement in ball guides 80. The high frequency oscillator 1 is enclosed in a casing 79 and is interconnected with the windings 6″ and 11′ by cables passing through bores or slots of the hollow shaft 65. Pulling springs 82 are connected to the carrier 81, the other end of the springs being anchored on the measuring head 78 in a manner not shown. Such springs tend to pull the carrier 81 inwardly, the radial inward motion of the carrier being limited by abutment of a bolt 83 against a stop pin 84 fixed in the measuring head 78. The stop bolt 83 has a thread screwed into a threaded sleeve 85 which may be rotated but not axially displaced, the bolt 83 being guided in a fixed plate 86 allowing axial displacement but not rotation of the bolt 83. A scale is provided on the upper portion of the bolt 83 indicating the bolt position in millimeters whereas the upper rim of the threaded sleeve 85 has a circumferential scale for indicating the axial position of the bolt 83 in 1/100 of a millimeter. By rotation of the threaded sleeve 85 the stop bolt 83 may be displaced for adjusting the desired radial position of the carrier 81 and particularly of the feeler 1.

Guiding pieces 89 are fixed on slides 87 which may laterally be displaced in guides of the carrier 81 by means of micrometer screws 88, the ends of the guide pieces 89 facing each other forming a V-shaped guide through which the cable 62 may be passed as illustrated in Fig. 3. A V-guide for the cable 62 constituted by two conic rollers 90 is provided radially opposite the guide pieces 89, the rollers 90 being mounted on an adjusting bolt 91 which may be adjusted in the measuring head in radial direction. The adjusting bolt 91 is similarly constructed as the bolt 83 described above and is screwed into a threaded sleeve 92 which is similar to the above described threaded sleeve 85 and the radial position of the guide rollers 90 may accurately be adjusted by rotation of the threaded sleeve 92. The adjusting bolt 91 and the threaded sleeve 92 are mounted on a slide 93 which may be displaced in axial direction of the measuring head on guide tubes 94 and the slide 93 may be secured in any desired axial position by means of a setscrew 95 or the like.

The cable of which an eccentricity shall be detected by the above described apparatus is passed between the guide pieces 89 and the guide rollers 90, whereby the radial position of the carrier 81, the lateral position of the guide pieces 89 and the radial position of the guide rollers 90 is so adjusted that the cable surface is passed at a little distance before the feeler 1. This distance is maintained at a constant value by the contact between the cable and the guide pieces 89 so that also the core 3 of the feeler coil 2, which is covered by a disc 96 of isolating material is continuously kept at a constant distance from the cable surface. The guide pieces 89 consist of a hard isolating material, for instance sapphire or the like so that such guide pieces will not take any influence on the electromagnetic field of the coil 2 and of the core 3 respectively.

In operation the cable 62 passes through the measuring device at a constant speed in the direction of the arrow in Fig. 2, while the hollow shaft 65 with the measuring head 78 continuously rotates at a low speed of for instance one rotation per second. Thereby the guide pieces 89 and the guide rollers 90 will glide round the cable surface, the feeler 1 being continuously rotated round the cable at a constant distance from the cable surface. Therefore the feeler is led along a screw line on the cable surface. During operation the whole electronic circuit shown in Fig. 1 is operative, whereby the oscillator 2, 4 is energized over the rotating transformer 6. The inductivity of the frequency determining coil 2 of the oscillator 2, 4 is affected by the cable conductor because this conductor enters into the electromagnetic field of the coil. Therefore the frequency of the oscillator 2, 4 is changed from its zero value when a cable is inserted before the feeler 1 in the manner illustrated, this change in frequency depending in the first line on the distance between the cable conductor and the core 3 and in the second line also from the diameter of the cable conductor. If the cable conductor is absolutely centered in the cable insulation, that is when the thickness of the cable insulation is the same over the whole circumference of the cable, the influence of the cable conductor on the inductivity of the coil 2 and therefore the frequency of the oscillator 2, 4 will be constant when the feeler 1 is turned round the cable in the manner described, that is there will be no temporary frequency changes. This constant frequency is transmitted over the rotating transformer 11 and over the cable 12 to the amplifier including tubes 13 and 15. The discriminator 17, 18, 19 will produce an invariable demodulated output voltage and therefore no voltage variations are applied through condenser 20 to the grid of tube 22. Consequently no voltage variations are transmitted to the grids of tubes 34 and 35, that is the same operating conditions are continuously maintained for both tubes 34 and 35.

During operation the cam disc 48 of the cam switch 70 schematically illustrated in Fig. 1 is continuously driven at the same speed as the hollow shaft 65 and the measuring head 78 with the feeler 1. Therefore the switches 46 and 47 are periodically closed in a moment in which the feeler 1 is in one of two predetermined positions spaced by 90° of the cable circumference. When the one or other of switches 46 and 47 are closed for a short time the one or other of tubes 34 and 35 respectively will become conducting as long as the corresponding switch 46 or 47 is closed, whereby the anode potentials of such tubes will temporarily decrease to the same value since the grid potentials in both tubes are the same. Thereby the diodes 38 and 39 will become conducting for a short time so that the potential on the condensers 41 and 44 is approached to and practically equalized with the minimum potential occurring on the anodes of tubes 34 and 35 respectively and due to the very high time constant particularly of the parallel connection of resistors 40 and charging condensers 41 the same potential is practically maintained by the condensers 41 during the non-conducting periods of about one second of the tubes 34 and 35 respectively. Therefore it may be assumed that the horizontal deflecting plate of the cathode ray tube 43, which is connected to the diode 38 is brought to and maintained at a potential equal to the minimum potential occurring on the anode of tube 34 when this tube is conducting, whereas the potential of the vertical deflecting plate of the cathode ray tube connected to the diode 39 will be brought to a potential equal to the minimum potential occurring on the anode of tube 34 when this tube is conducting. If the grid potentials of tubes 34 and 35 are equal the potentials on the horizonal and vertical deflecting plates of the cathode ray tube 43 will also be equal for evident reasons and these potentials will be kept at the same value as long as there is no potential change at the grids of tubes 34 and 35. Under these conditions the deflection of the electron beam of the cathode ray tube remains constant and may be adjusted in varying the potentials of the other deflecting plates by means of the potentiometers 55 and 56 in such a way that the luminous ring K schematically illustrated in Fig. 8 appears in the centre of the polar-coordinate system traced on the screen of the cathode ray tube.

If the conductor of the cable 62 has a certain eccentricity, for instance as schematically shown in a full line in Fig. 6 in which the centered position is indicated in a dash-dotted line, the distance between the feeler 1 and the conductor of the cable will continuously change when the feeler is rotating round the cable in the manner described and therefore frequency variations will occur in the oscillator 2, 4, the frequency deviations from a mean frequency being illustrated by the curve of Fig. 7, which shows that the frequency raises above the frequency mean for an angular range from about −30° to about +120° and the frequency falls below the frequency mean for the remaining angular range. As a consequence of these frequency variations the discriminators 17, 18, 19 will produce an output voltage periodically varying about a mean value substantially as indicated by the curve of Fig. 7 at a frequency of about 1 cycle. Over condenser 20 these potential variations are transmitted to the grid of tube 22 and this low frequency alternating voltage is amplified in tube 22 as well as in the following tubes 27 and 28 and is then transmitted over the decimal resistor 32 to the grids of tubes 34 and 35. The phase relations are so designed that the potential changes schematically illustrated in Fig. 7 appear on the grids of tubes 34 and 35 with opposite polarity. It is further assumed that the closing moments of switches 46 and 47 are so adjusted that the tubes 34 and 35 will become conducting when the feeler 1 is above the points 0° and 90° respectively with respect to the eccentric cable conductor schematically illustrated in Fig. 6, in which moments the potentials applied to the grids of tubes 34 and 35 are below the mean potential (earth potential) of such grids by the amounts indicated by arrows 34' and 35' in Fig. 7. When the tubes 34 and 35 become conducting in the moments 0° and 90° by closure of the switches 46 and 47 respectively the anode current in such tubes will not reach its normal mean value because the grid potentials are below normal value in those moments and therefore the anode voltage of tubes 34 and 35 will not reach as low a minimum value when the tubes are conducting as above described for no cable eccentricity. Therefore the potential of the condensers 41 and 44 and the potential of the deflecting plates of the cathode ray tube connected to such condensers will also rise to a value equal to the minimum voltage of the anodes of tubes 34 and 35 respectively, whereby the luminous ring on the screen of the cathode ray tube is deflected upwardly and to the right by equal amounts so that the luminous ring accurately indicates the amount and the direction of the eccentricity of the cable conductor (Fig. 8).

The main object of the measurement as described in the foregoing being to readjust the manufacturing apparatus for the cable whenever the eccentricity of the cable conductor exceeds an allowable safety limit, the indication of the eccentricity shall be related to that cross section of the cable where the same is actually being produced, for instance to the cable section just leaving the nozzle or die of an extruding press in which the cable conductor is coated with a mantle of plastic isolating material. As is well known in the cable manufacturing art cables may appreciably be twisted after having left the manufacturing machine. By adjustment of the angular position of the stationary part of the cam switch 70 that is of the contacts 46 and 47 twisting of the cable between the manufacturing device and the feeler 1 may be compensated by suitably changing the phase of the closing moments of switches 46 and 47. Under these circumstances the direction of eccentricity indicated on the screen of the cathode ray tube 43 is correctly related to the section where the cable is being produced and therefore the indication of eccentricity may directly be used for readjusting the manufacturing device, for instance the nozzle of the above mentioned extruding press. Thereby it is possible to so adjust the diameter of the luminous ring appearing on the screen of the cathode ray tube 43 that for a predetermined cable the allowable eccentricity is exceeded when the centre of the polar-coordinate system traced onto the screen leaves the luminous ring. In this case the person supervising the cable production will easily determine whether and in which direction readjustment of the manufacturing device is necessary.

The sensitivity of the measuring apparatus described is extremely high. For maximum sensitivity and an eccentricity of $\frac{1}{100}$ mm. of a cable conductor of 0.6 mm. diameter in a cable insulation of 0.2 mm. thickness the luminous ring on the screen of the cathode ray tube 43 is deflected by 4 mm. The sensitivity may be adjusted to the desired value by means of the decimal resistor 32 and the potentiometer 26.

As may be seen from Fig. 3 of the drawings, the guide rollers might not be sufficiently approached to the guide pieces 89 and to the feeler 1 for carrying a particularly thin cable. In this case two slides 93 each with guide rollers 90 are fixed on the tubes 94 of the measuring head 78 before and behind the feeler 1 and the thin cable is led over the guide rollers and the guide pieces 89 in a bow-shaped line so that it is continuously pressed against the guide pieces 89 and is therefore kept at a constant distance from the feeler 1. Another special arrangement is necessary for particularly thick cables where the guide rollers 90 have to be removed and whereby the guide pieces 89 are pressed against the very stiff cable by the pulling springs 82, the bolt 83 being lifted off the stop pine 84. The provision of springs 82 is equally advantageous for the other operating conditions of the apparatus wherein the guide rollers 90 are inserted and wherein the bolt 83 applies against the stop pin 84, because the pulling springs allow an elastical radial evading movement of the carrier 81 with the feeler 1 and the guide pieces 89 when exceptionally thick cable portions are passing through the apparatus particularly at the beginning of the cable production.

For calibrating or gauging the measuring apparatus this one is set to "idle" operation without a cable or anything in it, whereupon the desired size of the luminous ring appearing on the screen of the cathode ray tube 43 is adjusted and the ring is brought into the centre of the coordinate system as described in the foregoing. Thereafter a calibrating pin similar in its construction to the cable to be measured but having a known eccentricity of for instance $\frac{1}{100}$ mm. is inserted into the measuring apparatus and the apparatus is operated, whereby the desired sensitivity is adjusted. This last calibrating operation by means of a gauge pin may be dispensed with if calibrating curves are available for the type of cable to be tested. Since the mean operating frequency of the oscillator 2, 4 varies with the kind of the object to be tested it will often be desirable to adjust the operating point of the discriminator to which end the instrument 60 (Fig. 1) is connected to the output of the discriminator whereafter the operating point of the discriminator is adjusted by means of the variable condenser 16.

Of course the measuring method of this invention is not limited to the measurement of eccentricities of cable conductors but the method may as well be used for testing the regularity of thickness of tube walls, the eccentricity of bodies built up from different metals, for instance conductors consisting of an iron core and a copper mantle, the eccentricity of the bore of capillary tubes and so on.

By way of example, Figs. 4 and 5 schematically illustrate a device for measuring the eccentricity of the bore of tubes 100, the tubes being produced in a well known manner from a plastic material put under pressure in a container 101 by extrusion through an extruding nozzle or die 102. A cylindrical measuring core 105 is journalled by means of a bearing 108 at the free end of a telescope rod 104 fixed on the adjustable screen 103 of the nozzle or die 102. The telescope rod 104 may be pressed out into the operating position illustrated by a pressure fluid, for instance compressed air admitted through a pipe 106 to the interior of the telescope rod. The measuring core 105 has a diameter somewhat smaller than the bore diameter of the tube so that the core may freely roll off in the bore of the tube. Immediately after the beginning of the production the measuring core 105 is pressed out into the position shown in Fig. 6 in the manner set out above. In the position illustrated the measuring core 105 which is made of a magnetisable material is opposite the measuring feeler 109 and a permanent magnet or electromagnet 107 by which the core is pulled into contact with the inner tube wall just opposite the feeler 109. The feeler 109 and the magnet 107 are now rotated round the tube 100 in the manner described for the cable 62, whereby the measuring core 105 rolls on the inner wall of the tube. As described above for the cable 62 the thickness of the tube wall is continuously measured and indication of bore eccentricity is effected as set out for the cable conductor.

When a sufficiently low operating frequency is used it is even possible to measure the eccentricity of the bore of metallic tubes or similar pieces. The measuring method of this invention might also be used for measuring the eccentricity of rotating cylindrical machine parts or work pieces whereby the feeler would be stationary and the work piece or machine part or the like to be tested would rotate before the feeler. Instead of one single feeler at least two feelers might be distributed over the body to be tested and such feelers might be connected into the measuring circuit in cyclic order in order to successively determine the thickness of the mantle of the body for different places on the body. When one single feeler is used this feeler might effect an oscillating movement instead of continuously rotating round the body to be tested and the pulsewise measurement in accordance with the foregoing description might be effected for predetermined places and moments of the periodic oscillating movement of the feeler. This kind of measurement suggests itself particularly for exceptionally big measuring objects.

For many purposes it may be desired to measure at the same time the eccentricity and the size of the core of a body, for instance the conductor of a cable. In this case the mean of the discriminator output voltage may be formed and indicated, this mean being a function of the conductor size, because the frequency of the measuring oscillators 2, 4 shown in Fig. 1 also depends on the absolute size of the cable conductor. The mean of the discriminator output voltage may also be used for automatically controlling the amplitude of the oscillator for circularly deflecting the beam of the cathode ray tube 43, in which case an indication as to size and to eccentricity of the cable conductor may be obtained at the same time on the screen of the tube 43.

Of course the electrical measuring quantities corresponding to the eccentricity, produced in the manner described might be used for controlling a device for automatically readjusting the manufacturing apparatus in which the tested product is produced and whereby excessive eccentricity would automatically be avoided.

An amplitude modulated measuring oscillation may be used instead of a frequency modulated measuring oscillation, whereby a measuring coil corresponding to the measuring coil 2 might be connected in one branch of an A.C. Wheatstone bridge of which the output voltage would be amplified and subjected to a phase-controlled demodulation.

Instead of effecting the measurement by means of an electromagnetic field set up in the mantle of the body to be tested the measurement might also be effected by means of an acoustical field or of an electrical field. The measurement might also be effected by setting up in the mantle of the body to be tested an X-ray or γ-ray field or a field of a hard corpuscle radiation.

What I claim is:

1. A method for determining the position of the core of a body consisting of a core and a mantle covering the core, the core and the mantle being made of materials having different properties, by feeler means adapted to detect the mantle thickness of the body, comprising continuously and periodically rotating one single feeler round the body for continuously detecting the mantle thickness along the whole circumference of the body, producing an electric measuring quantity in accordance with the variations measured of the thickness of the mantle, periodically determining the momentary value of the said measuring quantity when the said feeler is in its horizontal and vertical position respectively relatively to the said body, such positions being spaced from each other by 90°, providing two electric storing means, storing each of the said momentary values of the measuring quantity in one of the said storing means, and continuously deflecting the electron beam of a cathode ray tube in the horizontal and vertical direction respectively in accordance with the said stored momentary value of the measuring quantity in order to indicate the value and direction of the eccentricity of the said core on the screen of the cathode ray tube.

2. A method for determining the positon of the core of a body consisting of a core and a mantle covering the core, the core and the mantle being made of material having different properties, by feeler means adapted to detect the mantle thickness of the body, comprising perioidically and successively bringing one single feeler into two different distinct positions relatively to the said body while continuously detecting the mantle thickness by the said feeler, producing an electric measuring quantity in accordance with the variations measured of the thickness of the mantle, periodically determining the momentary value of the said measuring quantity when the said feeler is in its said distinct positions relatively to the said body, separately storing each of the said momentary values of the measuring quantity and continuously deflecting the electron beam of a cathode ray tube in two directions in accordance with the said stored momentary values of the measuring quantity in order to indicate the value and direction of the eccentricity of the said core on the screen of the cathode ray tube.

3. A method according to claim 2, comprising producing phase-shifted alternating current signals and superposing them to the said stored measuring quantities for continuously deflecting the electron beam in a circular path for producing a luminous ring on the screen of the cathode ray tube.

4. A method according to claim 3, comprising adjusting the amplitude of the said alternating current signals to such a value that a luminous ring is produced on the screen of the cathode ray tube of such a size that the allowable eccentricity is exceeded when the said luminous ring completely leaves the center of the screen of the cathode ray tube.

5. A method according to claim 2, wherein an oscillating motion is imparted to one single feeler for bringing it periodically into the said distinct positions.

6. A method according to claim 2, wherein the body is rotated whereas the single feeler is kept stationary.

7. A method according to claim 2, wherein the body is oscillated whereas the single feeler is kept stationary.

8. A method for determining the position of the core of a body consisting of a core and a mantle covering the core, the core and the mantle being made of materials having different properties, by feeler means adapted to detect the mantle thickness of the body, comprising providing a cyclic relative movement between one single feeler and the body, thereby displacing the feeler along the surface of the body, continuously detecting the mantle thickness during the cyclic relative movement between the said single feeler and the body, producing an electric measuring quantity in accordance with the measured mantle thickness, variations of the said measuring quantity being obtained during the said relative cyclic movement between the feeler and the body when there are variations of the mantle thickness, periodically detecting the momentary value of the said measuring quantity at distinct points of the said cyclic relative movement, producing and maintaining constant electrical potentials in accordance with each of the said detected momentary values of the measuring quantity, and producing a steady and continuous indication of the position of the core of the body by means of the said constant electrical potentials.

References Cited in the file of this patent

UNITED STATES PATENTS

| 2,274,735 | Peters et al. | Mar. 3, 1942 |
| 2,519,367 | Gunn et al. | Aug. 22, 1950 |
| 2,558,485 | Gow | June 26, 1951 |
| 2,604,512 | Bacon et al. | July 22, 1952 |
| 2,629,004 | Greenough | Feb. 17, 1953 |

FOREIGN PATENTS

| 641,674 | Great Britain | Aug. 16, 1950 |